(12) United States Patent
Pollak et al.

(10) Patent No.: US 8,589,212 B2
(45) Date of Patent: Nov. 19, 2013

(54) VEHICLE DESIRABILITY AND STOCKING BASED ON LIVE MARKETS

(75) Inventors: Dale Pollak, Hinsdale, IL (US); Michael A. Chiovari, Batavia, IL (US); David Hawkins, Austin, TX (US); Chris Matthew Stutsman, Austin, TX (US)

(73) Assignee: Vauto, Inc., Oak Brook, IL (US)

( * ) Notice: Subject to any disclaimer, the term of this patent is extended or adjusted under 35 U.S.C. 154(b) by 0 days.

(21) Appl. No.: 13/551,365

(22) Filed: Jul. 17, 2012

(65) Prior Publication Data

US 2013/0030864 A1    Jan. 31, 2013

Related U.S. Application Data (60) Provisional application No. 61/512,263, filed on Jul. 27, 2011.

(51) Int. Cl.
*G06Q 30/00* (2012.01)

(52) U.S. Cl.
USPC .......................................................... 705/7.35

(58) Field of Classification Search
USPC .......................................................... 705/7.35
See application file for complete search history.

(56) References Cited

U.S. PATENT DOCUMENTS

| | | | | |
|---|---|---|---|---|
| 2003/0130975 A1* | 7/2003 | Muller | ............................ | 706/50 |
| 2005/0256780 A1* | 11/2005 | Eldred | ............................ | 705/26 |
| 2007/0174135 A1* | 7/2007 | Lynch | ............................ | 705/26 |
| 2009/0006118 A1* | 1/2009 | Pollak | ............................ | 705/1 |
| 2009/0083130 A1* | 3/2009 | Hall et al. | ....................... | 705/10 |
| 2009/0157522 A1 | 6/2009 | Srinivasan et al. | | |
| 2010/0198629 A1 | 8/2010 | Weisleder et al. | | |
| 2011/0161193 A1 | 6/2011 | Heppe | | |
| 2011/0238665 A1* | 9/2011 | Parikh et al. | .................. | 707/740 |

FOREIGN PATENT DOCUMENTS

| | | |
|---|---|---|
| KR | 100714190 B1 | 5/2007 |
| WO | WO 2007/035195 A2 * | 3/2007 |

OTHER PUBLICATIONS

LeMay, Tracy, "More Ways to Avoid the Car Salesman," National Post, National Edition, Don Mills, Ont., Feb. 23, 2000, p. D04.*
Dubroff, Henry, "Skiing Hot, Clothes Not in Denver," Denver Post, Denver, Colo., Jun. 22, 1990, 1.*
First Research Industry Profiles, "Automobile Dealerships—Quarterly Update Feb. 1, 2010," Feb. 1, 2010.*
International Search Report and Written Opinion for International Application No. PCT/US2012/048545 mailed Jun. 12, 2013.

* cited by examiner

*Primary Examiner* — Nathan Erb
(74) *Attorney, Agent, or Firm* — Sutherland Asbill & Brennan LLP (57) ABSTRACT

Systems and methods for determining one or more vehicles that are desirable for stocking an inventory of a dealer may include receiving one or more vehicle purchasing parameters from a dealer; receiving one or more behavior metrics associated with one or more consumers of at least one of the dealer, a vehicle wholesaler, or a vehicle retailer; determining, based at least in part on the vehicle purchasing parameters and the behavior metrics, one or more vehicles; determining, based at least in part on the vehicle purchasing parameters and the behavior metrics, a justifiable purchase price for the vehicles; determining a location of the vehicles; and determining, based at least in part on the justifiable purchase price and the location of the vehicles, at least a portion of the vehicles for restocking an inventory of the dealer.

28 Claims, 3 Drawing Sheets

VEHICLE DESIRABILITY AND STOCKING BASED ON LIVE MARKETS

RELATED APPLICATION

The present application claims the benefit of U.S. Provisional Patent Application No. 61/512,263, filed Jul. 27, 2011, entitled "VEHICLE DESIRABILITY AND STOCKING BASED ON LIVE MARKETS," which is hereby incorporated by reference in its entirety.

BACKGROUND

Acquiring vehicle inventory, such as for used and/or new automobile sales lots, requires intuition and a knowledge of current vehicle markets. Often, a vehicle salesperson or manager's intuition can be wrong. Additionally, fully understanding current sales markets for multiple vehicle types in multiple markets can be an exhausting and often times futile task. Incorrect decisions and/or market analysis data can lead to vehicle sales lots being overstocked with vehicles that are not selling and/or are not profitable. Thus, finding ways to acquire vehicle inventory to appropriately stock vehicle lots continues to be a priority.

BRIEF DESCRIPTION OF THE DRAWINGS

The detailed description is set forth with reference to the accompanying drawings, which are not necessarily drawn to scale. In the figures, the left-most digit(s) of a reference number identifies the figure in which the reference number first appears. The same reference numbers in different figures indicate similar or identical items.

DETAILED DESCRIPTION

Overview

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the invention are directed to, among other things, performing vehicle desirability and stocking based on live markets. As an overview, retail automobile dealers often have used car operations and, generally, managing these operations involves acquiring inventory. Acquiring inventory often involves receiving trade-ins and/or acquiring vehicles from the general wholesale marketplace. This includes, but is not limited to, buying vehicles from established wholesale auctions, independent wholesalers, and/or other dealers who may sell vehicles at wholesale prices.

Vehicle dealers are often faced with answering the following questions: what types of vehicles should be placed on the lot for sale, how much should the dealer pay for the vehicle, and/or where can the appropriate vehicles (at the right price) be found at the wholesale level? Additionally, live markets may include information regarding what vehicles are being purchased by consumers in the surrounding markets, or any market, within a particular time period (often, including a current, or near-current, time period) and/or for what price these vehicles are being purchased. That is, according to an example embodiment of the invention, live market data may be contrasted with historical dealer data (i.e., a dealership's own past sales track record) in that it includes current and historical data outside of the dealership. However, in some example embodiments, the live market data may include the historical dealer data (e.g., when the historical data of the dealer is included in the live market data).

An inventory management solution, according to an example embodiment of the invention, may have access to complete, or near compete, data associated with one or more wholesale marketplace vendors and/or retail marketplace vendors. Additionally, such vendors may be live vendors, such as in the case of wholesale vehicle auction companies and/or online vendors, such as with online retail vehicle vendors or online live auctions, wholesale or retail, that offer online interaction. Similarly, the inventory management solution may be accessible over a public or private network, such as the Internet, by one or more automobile dealerships or dealers. These dealers, according to one example embodiment of the invention, may interact with a server, or other computing device, of the inventory management solution by way of software implementation on a computing device of the dealer and/or via a Web application of the inventory management solution.

Illustrative Architecture

Figure 1:
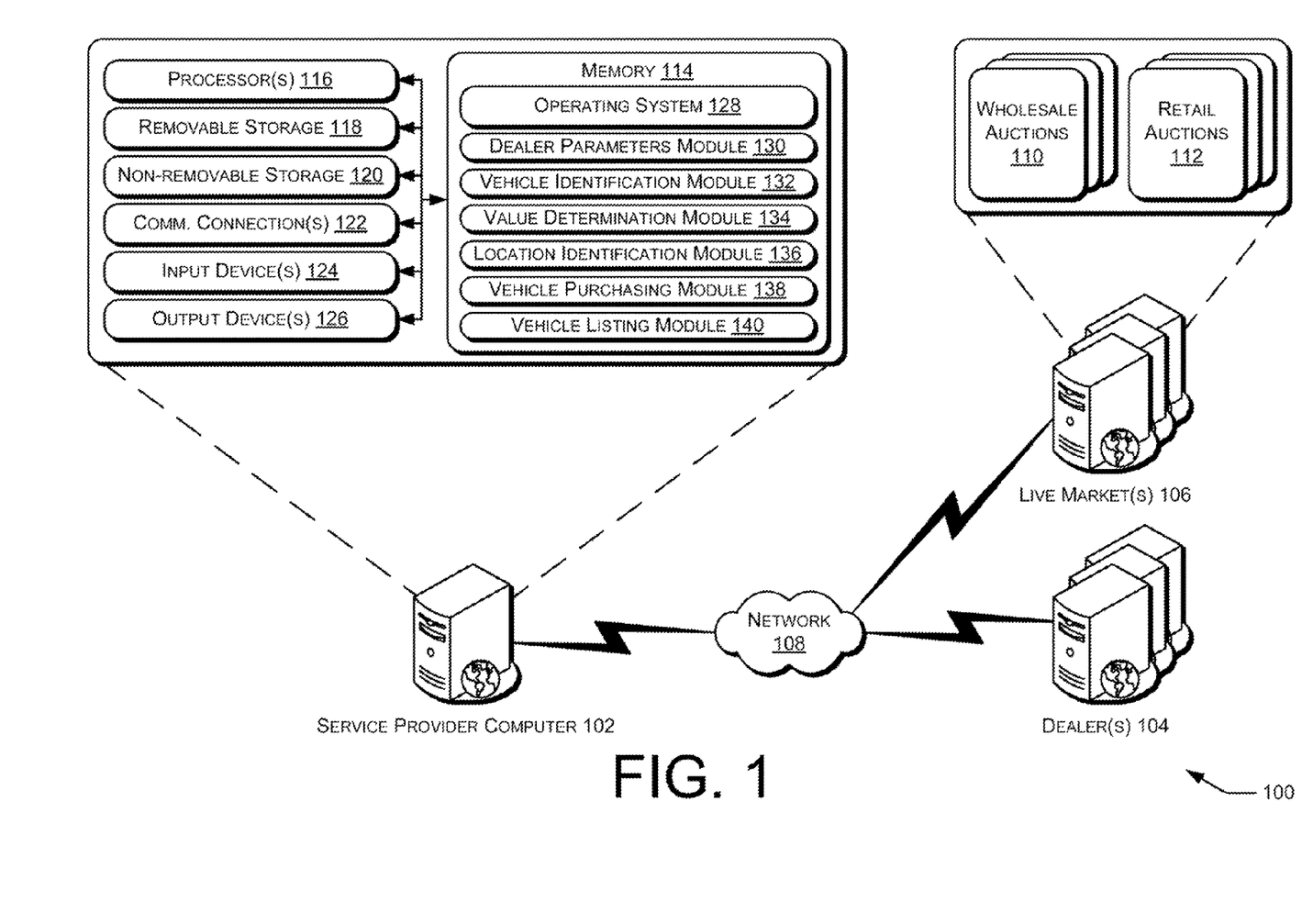
FIG. 1 is a block diagram of an illustrative system for performing vehicle desirability and stocking based on live markets, according to an embodiment of the invention.

FIG. 1 illustrates an example system 100 for performing vehicle desirability and stocking based on live markets, according to an example embodiment of the invention. As shown in FIG. 1, the system 100 may include a service provider computer 102, one or more dealer computers 104, and one or more live market computers 106. Additionally, each of the dealer computer 104 and/or the live market computer 106 may be in communication with each other as well as with the service provider computer 102 over a network 108, such as the Internet or the like. Further, according to an example embodiment of the invention, the service provider computer 102 may be operated and/or controlled by an inventory management solution as described above.

According to an example embodiment of the invention, the one or more live market computers 106 may be associated with one or more wholesale auctions 110 and/or one or more retail auctions 112. Wholesale auctions 110 may be organized and/or operated by wholesale auction entities, wholesale dealers, or the like, and may be live and/or online auctions. Similarly, retail auctions 112 may be organized and/or operated by retail auction entities, retail dealers, or the like, and may be live and/or online auctions. Either way, whether live or online, live market computers 106 may receive, collect, and/or store sales information and/or user behavior information from the wholesale auctions 110 and/or the retail auctions 112.

In one example embodiment of the invention, a retail auction entity and/or wholesale auction entity may collect information associated with a user's behavior on a retail automotive sales website. For example, a retail auction entity may record searches, hyperlink selections, bids, prices, and/or purchases made by the user during a particular session. Further, this information may be recorded for all users or a subset of users and the data may be aggregated to create averages and/or stored individually for later processing. As noted above, a service provider computer 102 may be in communication with the live market computers 106 over a network 108. Thus, the service provider computer 102 may leverage the data associated either or both of the wholesale auctions 110 or the retail auctions 112.

When a dealer, potentially operating one or more dealer computers 104, desires to identify vehicles for restocking the dealer's inventory, the dealer computer 102 may access the service provider computer 102 over the network 108. According to an example embodiment of the invention, the service provider computer 102, in response to a request, may assist the dealer in 1) identifying optimal vehicles to add to the dealer's inventory, 2) determine a price the dealer can justify paying for the identified optimal vehicles, and 3) identify where to locate the identified optimal vehicles, which may be based on a service contract, a transactional model, and/or an auction inventory. To that end, the dealer may be able to submit one or more parameters to guide or instruct the service provider computer 102 towards what types of vehicles to identify. For example, a dealer may set vehicle type, cost, quality, grade, brand, price, transport cost, etc. parameters weekly, monthly, or at any interval such that the service provider computer 102 only searches for vehicles within those parameters. Additionally, in some aspects, the service provider computer 102 may also assist the dealer with purchasing and/or selling vehicles via one or more wholesale auctions 110 and/or purchasing/selling vehicles via one or more retail auctions 112.

FIG. 1 also provides an illustrative overview of one example service provider computer 102, according to one example embodiment of the invention. The service provider computer 102 may be configured as any suitable computing device capable of implementing vehicle desirability and stocking based on live markets. By way of example and not limitation, suitable computing devices may include personal computers (PCs), servers, server farms, data centers, or any other device capable of storing and executing all or part of the example system 100.

In one illustrative configuration, the service provider computer 102 may comprise at least a memory 114 and one or more processing units (or processor(s)) 116. The processor(s) 116 may be implemented as appropriate in hardware, software, firmware, or combinations thereof Software or firmware implementations of the processor(s) 116 may include computer-executable or machine-executable instructions written in any suitable programming language to perform the various functions described.

Memory 114 may store program instructions that are loadable and executable on the processor(s) 116, as well as data generated during the execution of these programs. Depending on the configuration and type of service provider computer 102, memory 114 may be volatile (such as random access memory (RAM)) and/or non-volatile (such as read-only memory (ROM), flash memory, etc.). The computing device or server may also include additional removable storage 118 and/or non-removable storage 120 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 114 may include multiple different types of memory, such as static random access memory (SRAM), dynamic random access memory (DRAM), or ROM.

Memory 114, removable storage 118, and non-removable storage 120 are all examples of computer-readable storage media. For example, computer-readable storage media may include volatile and non-volatile, removable and non-removable media implemented in any method or technology for storage of information such as computer-readable instructions, data structures, program modules or other data. Memory 114, removable storage 118, and non-removable storage 120 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can accessed by the server or other computing device. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer 102 may also contain communication connection(s) 122 that allow the service provider computer 102 to communicate with one or more stored databases, other computing devices or servers, user terminals, and/or other devices on a network 108, such as the one or more dealer computers 104 and/or live market computers 106. The service provider computer 102 may also include input device(s) 124 such as a keyboard, mouse, pen, voice input device, touch input device, etc., and output device(s) 126, such as a display, speakers, printer, etc.

Turning to the contents of the memory 114 in more detail, the memory 114 may include an operating system 128 and one or more application programs or services for implementing the features disclosed herein including a dealer parameters module 130 and a vehicle identification module 132. The vehicle parameters module 130 may be configured to receive and/or store parameters assigned by a dealer, including but not limited to, vehicle type, make, model, color, condition, grade, and/or the like, and also including pricing presets such as wholesale price, potential retail price, acceptable profit margins, and/or preferred markup percentages. According to an example embodiment of the invention, these parameters may be set by using one or more dealer computers 104, or any type of computing device accessible by a dealer, such as mobile devices and the like that have access to a network such as network 108.

Additionally, according to an example embodiment of the invention, the vehicle identification module 132, as described briefly above, may be configured to identify optimal vehicles to be added to the inventory of an automobile dealer. According to at least one example embodiment of the invention, the vehicle identification module 132 may leverage behavior data of consumers of retail auctions 112, wholesale auctions 114, and/or other websites for purchasing vehicles at retail and/or wholes prices. In some aspects, the actions and/or behaviors of the consumer may be received by the service provider computer 102 via an input device 124, for example, and may be applied to identifying appropriate vehicles for the dealer.

Further, according to an example embodiment of the invention, the vehicle identification module 132 may be configured to pass the data and/or dealer parameters through an algorithm for making such a determination. The data may include, user searches, sales volumes, market day supply information, average retail profitability, and/or availability. Further, the algorithm may provide a desirability score based on a weighted average of the data. The weight of each input may be based on default values or may be assigned and/or adjusted by the dealers. Additionally, prior to implementing the desirability algorithm to determine the desirability score, the service provider computer 102 may be configured to provide dealers with filters such that the dealer may narrow down the data to be applied. By way of example only, the dealers may filter the data by vehicle type, vehicle segment (e.g., subcompact, compact, standard, luxury, etc.) vehicle color, vehicle price, vehicle make, vehicle model, vehicle location, vehicle rating, miles of the vehicle, vehicle class, vehicle condition, vehicle grade, tire brand, tire tread depth, number of owners, and/or combinations of the foregoing and the like. As such, a dealer may request a desirability be score be derived based only on one or more of the above categories or others being applied.

The memory 114 may also include a value determination module 134 and a location identification module 136. According to an example embodiment of the invention, the value determination module 134 may determine a price that a dealer can justify paying for the vehicle(s) identified by the vehicle identification module 132. This determination may be made based on one or more of several factors, including but not limited to, a blue book value, an average sale price in a particular geographic area, a popularity of the vehicles, dealer parameters (e.g., margin presets), etc. Additionally, according to an example embodiment of the invention, the location identification module 136 may identify locations where one or more vehicles, that match the results of the vehicle identify module 132 and the value determination module 134, can be found for sale by a wholesaler. Again, and as noted above, the vehicle identification module 132, the value determination module 134 and/or the location identification module 136 may utilize data received from other modules and/or over the network 108 from the one or more live market computers 106. That is, consumer behavior information, wholesale vehicle availability and prices, as well as location information can be received from the live market computers 106, and each of modules 132, 134, and 136 may be configured to make determinations based at least in part on this information.

According to some example embodiments of the invention, the location identification module 136 may also be able to determine, once one or more appropriate vehicles have been discovered for sale at one or more wholesale auctions, which wholesale auction may be best for the dealer. That is, the location identification module 136 may be configured to rank the vehicles that have been found for sale (e.g., most recent sales) so that the dealer may make a more informed purchase. In one example, the location identification module 136 may receive, from the live market computers 106, previous sale prices for the particular car identified and may be configured to provide a higher rank to auctions with lower sale prices and/or lower transportation costs (e.g., auction sites that are closer to the dealer will presumably have lower transportation costs while auction sites further away will presumably cost the dealer more).

Additionally, the service provider computer 102 may also be configured to provide a "buy list" to the dealers. A "buy list" may be a list of vehicles that have been determined to match criteria set by the dealer and have been determined to be optimal by the service provider computer 102. That is, once the dealer sets the filters noted above, the vehicle identification module 132 identifies optimal vehicles for the dealer, the value determination module 134 determines a justifiable purchase amount for the optimal vehicles, and the location identification module 136 identifies a certain number of optimal vehicles for sale at wholesale auctions within the justifiable purchase price, the service provider computer 102 may provide the certain number of optimal vehicles in the "buy list." Further, the service provider computer 102 may send an electronic notification (e.g., email, text, voice message, instant message, etc.) to a dealer when any of the vehicles on the "buy list" are available for sale, or alternatively, the "buy list" may be generated for me one or more specific wholesale auctions. The message may request that the dealer approve and/or veto a bid or bid range for purchasing one of the vehicles. The service provider computer 102 may also allow the dealer to specify a minimum vehicle condition grade, a specific color, etc. to indicate which vehicles they will approve bidding on even without approval.

According to an example embodiment of the invention, the memory 114 may also include a vehicle purchasing module 138 and a vehicle listing module 140. By way of example only, upon approval by the dealer (and potentially after viewing qualitative description information, such as vehicle photographs and/or detailed specification information), the vehicle purchasing module 138 may submit a proxy bid with the dealer conditions to the appropriate wholesale auction. In some examples, an auction identifier, that identifies the dealer, may be included with a submitted proxy bid such that the wholesaler will know which dealer to charge for the winning auction. Thus, the dealer may purchase vehicles from wholesale auctions, or other wholesale sellers, based on this proxy bid upon approving vehicles listed in the "buy list." In some examples, approval may include utilizing any of the filtering options listed above such that the dealer may automatically disapprove of a vehicle that does not qualify under a specific filter, or rule, place by the dealer. For example, the dealer may set an indicator such that the vehicle purchasing module 138 may only place bids for vehicles with a particular color, tire tread depth, mileage, etc. Additionally, the vehicle purchasing module 138 may then receive specific vehicle information associated with the purchased vehicles from the wholesale seller. This information may then be transmitted to the vehicle listing module 140 which may be configured to provide this specific vehicle information to a retail auction 112, or other retail vehicle seller, as part of listing the recently purchased vehicle for sale. In this way, the vehicle listing module 140 may automatically list for sale each vehicle purchased by the dealer.

According to certain example embodiments of the invention, an operator of the service provider computer 102, performing vehicle desirability and stocking based on live markets as described above, may charge dealers for decisioning software in a modular format. For example, a dealer may purchase a stocking module, a pricing module, and/or an appraising module from the service provider and each associated price may be based on monthly or annual subscriptions. However, in an alternative example embodiment, dealers may be charged on a per transaction model. In this way, each transaction, regardless of which module 132, 134, 136, 138, or 140 provides the service, may be associated with a different fee.

As noted above, in an example embodiment of the invention, the vehicle identification module 132 may be configured to provide a desirability score. In some instances, this desirability score may be calculated based on an algorithm that processes data received from the live market computers 106. For example, information received from, and/or determined base on, wholesale auctions 110 and/or retail auctions 112 may be processed to calculate multiple attributes.

According to an example embodiment of the invention, the attributes include, but are not limited to, vehicle interest, vehicle sales volume, market day supply for the vehicle, profitability of the vehicle, and availability of the vehicle. Each attribute may be given a score, for example, from zero to one hundred, and then a weighted average may be calculated. This weighted average may be the desirability score. Additionally, in some aspects, the attribute weighting may be predefined, such as a default weighting; however, in other aspects, the dealer may redefine or otherwise change the weighting.

The "interest" attribute may be defined based on the number of searches in the market for a specific vehicle relative to all other vehicles being searched for in the market, in a given period of time. That is, relative to a total number of searches performed on a retail auction 112 website, the number of searches performed on that website for a vehicle (which may be defined for example, as one or more of make, body, style, model, location, year, etc.) may define the "interest" score for that vehicle. Thus, vehicles with higher search frequency, will have a higher "interest" scores. Similarly, the "volume" attribute is based on how many types of vehicles are being sold on the retail market. Additionally, the "market day supply" may be based on a fraction comprising the current availability of a particular vehicle in a particular market for sale divided by its average retail sales rate over a predefined period (e.g., 15, 30, 45 days, etc.). This metric may be a single numeric expression that references the supply of the vehicle versus the demand of the vehicle. The "market day supply" value, or percentile, may then be calculated based on a standard distribution including the market day supply for each vehicle sold within the predefined period. The percentile may then be used as the value for this attribute. The "profitability" attribute may be determined based on the difference between the average retail asking price or transaction price for the particular vehicle in the particular market and the average wholesale transaction price given the same vehicle in the same market. Auction fees and/or transportation fees may be included in this calculation. Additionally, the dealer may define a geographic radius for these calculations. Further, the "availability" attribute may be based on the actual availability of the particular vehicle within the wholesale market.

Additionally, according to an example embodiment of the invention, the service provider computer 102 may receive past sales history form the dealer computer 104 indicating sales volume. Based on this sales volume, the service provider computer 102, and/or the vehicle purchasing module 138, may determine an optimal number of vehicles to bid on, and after winning the optimal (or max) auctions then notifying the dealer and/or stopping any further proxy bidding by the vehicle purchasing module 138. In this way, the dealer may avoid being overstocked. In an example embodiment of the invention, the dealer may also set a dealership day supply of vehicles and the service provider computer 102 may be able to determine how many vehicles should be purchased. the dealer may also set a dealership day supply of vehicles and the service provider computer 102 may be able to determine how many vehicles should be purchased Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example system 100 and service provider computer 102 shown in FIG. 1 are provided by way of example only. Numerous other operating environments, system architectures, and device configurations are possible. Accordingly, embodiments of the present invention should not be construed as being limited to any particular operating environment, system architecture, or device configuration.

Illustrative Processes

Figure 2:
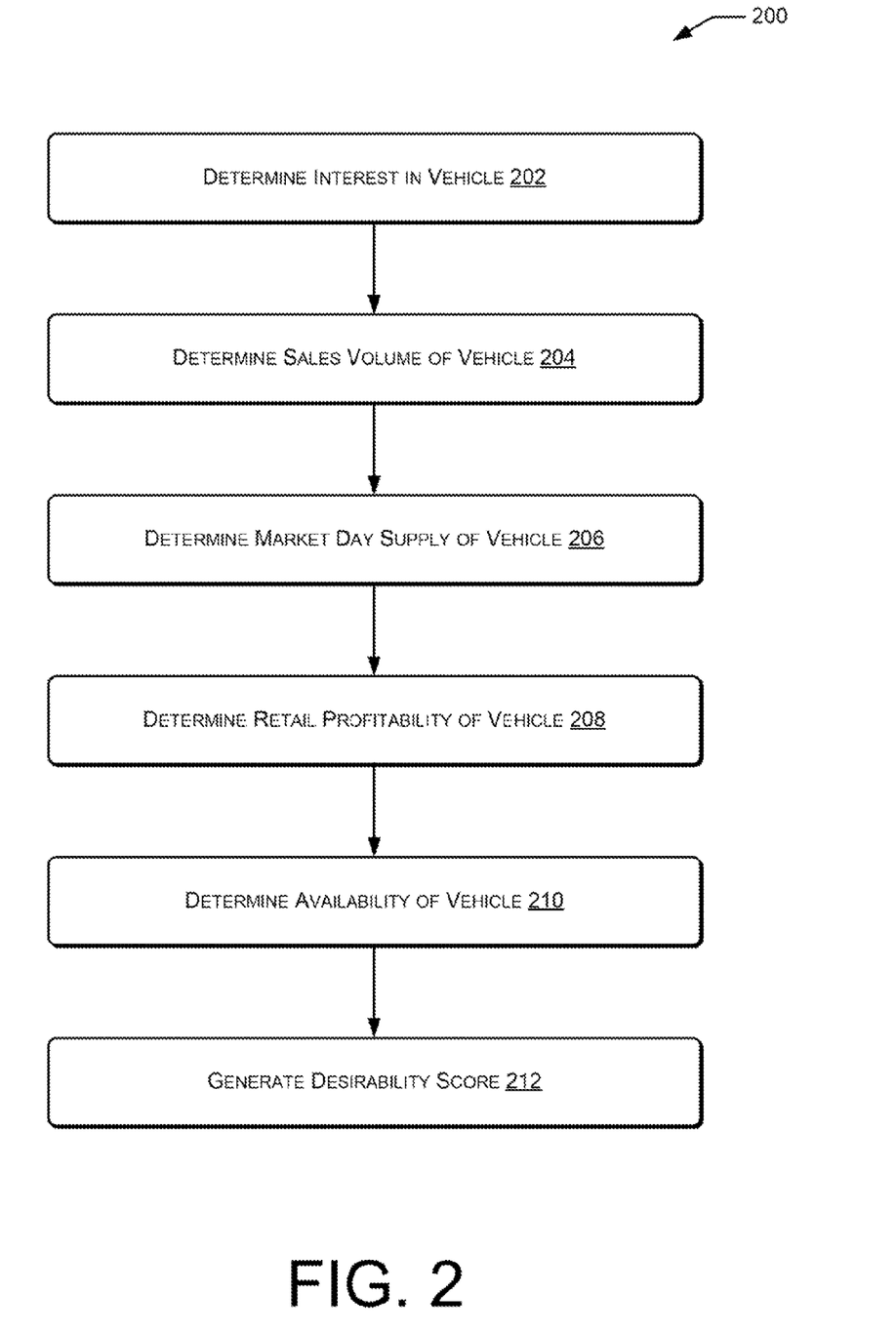
FIG. 2 is a flow diagram illustrating details of a method for determining vehicle desirability based on live markets, according to an embodiment of the invention.

FIG. 2 is a flow diagram of an illustrative process 200 for determining vehicle desirability based on live markets, as described with reference to FIG. 1. The illustrative process 200 may be utilized to generate a desirability score for vehicles available for sale on the wholesale market. In one example, the service provider computer 102 may perform any or all of the operations of process 200.

This process 200 is illustrated as a logical flow graph, in which each operation represents a sequence of operations that can be implemented in hardware, software, or a combination thereof In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 200 may begin at block 202 in which the process 200 may determine an interest in a particular vehicle. As described above, determining "interest" may include determining or receiving, from a vehicle retailer or other website, a number of searches made by consumers in the retail market for that particular vehicle relative to all other vehicles being searched for in the market, in a given period of time. At block 204 the process 200 may determine a sales volume of the particular vehicle. According to an example embodiment of the invention, determining "sales volume" may include determining, or receiving from a retailer, the number of the particular vehicle being sold on the retail market during the given period of time. At block 206, the process 200 may determine a market day supply of the particular vehicle. As described above, the "market day supply" may be based on a fraction comprising the current availability of a particular vehicle in a particular market for sale divided by its average retail sales rate over a predefined period (e.g., 15, 30, 45 days, etc.). The "market day supply" value, or percentile, may then be calculated based on a standard distribution including the market day supply for each vehicle sold within the given period.

At block 208, the process 200 may determine a retail profitability of the vehicle. According to an example embodiment of the invention, the "profitability" may be determined based on the difference between the average retail asking price or transaction price for the particular vehicle in the particular market and the average wholesale transaction price given the same vehicle in the same market. Auction fees and/or transportation fees may be included in this calculation. Additionally, the dealer may define a geographic radius for this determination. At block 210, the process 200 may determine an availability of the particular vehicle based on data received from the live market computers 110 and/or 112 of FIG. 1. The user's preset parameters may also be used as factors for determining one or more the following determinations, respectively at blocks 202, 204, 206, 208, and/or 210.

The process 200 may then end at block 212, where the process 200 may generate a desirability score for the particular vehicle. The desirability score may be determined based on one or more of the previous determinations at blocks 202, 204, 206, 208, and/or 210. According to an example embodiment of the invention, each result of the previous determinations may be averaged. In some examples, the average may be weighted based on a default weighting, while in other examples, the dealer may provide a weighting and/or may adjust the default weighting. Additionally, the process 200 may be performed for every vehicle available in the wholesale market, such as those available for sale in wholesale auctions 110, or for a subset of every vehicle. Further, the process 200 may be performed on only vehicles that match the dealer's predefined parameters set via the dealer parameters module 130.

Figure 3:
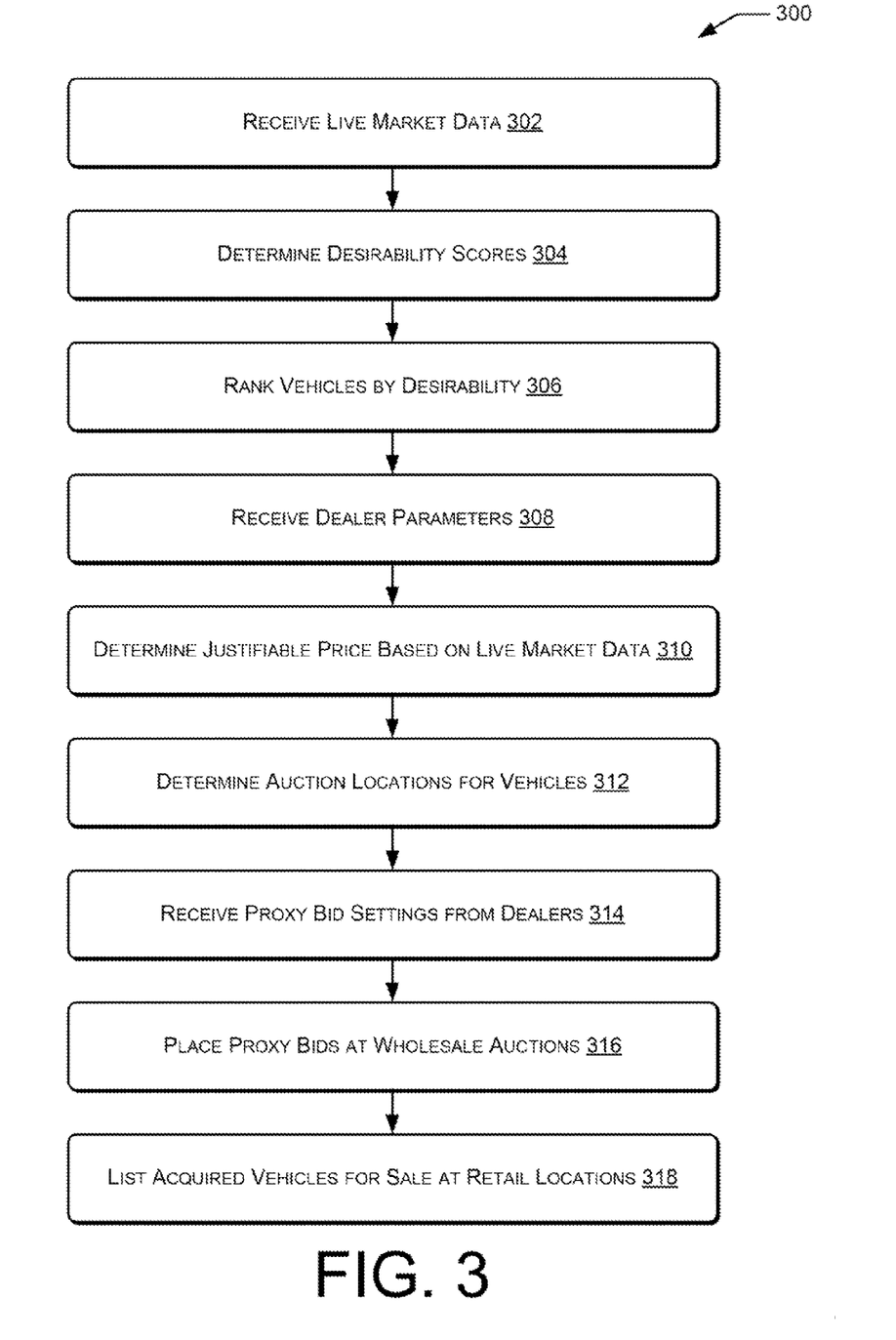
FIG. 3 is a flow diagram illustrating details of a method for performing vehicle desirability and stocking based on live markets, according to an embodiment of the invention.

FIG. 3 is a flow diagram of an illustrative process 300 for implementing vehicle desirability and stocking based on live markets, as described with reference to FIG. 1. The illustrative process 300 may be utilized to appropriately stock a dealership with vehicles to be sold on the retail or wholesale market. In one example, the service provider computer 102 may perform any or all of the operations of process 300.

This process 300 is illustrated as a logical flow graph, in which each operation represents a sequence of operations that can be implemented in hardware, software, or a combination thereof In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302 in which the process 300 may receive live market data, such as but not limited to, information related to vehicle searches, purchases, prices, and the like, on retail and/or wholesale markets. At block 304 the process 300 may determine desirability scores for each, or a subset of each, of the vehicles on the live market and then rank the vehicles by the determined desirability scores at block 306. At block 308, the process 300 may receive dealer parameters regarding desired grade attributes (e.g., only cars scoring B+ or higher). At block 310, the process 300 may determine a justifiable price for a vehicle based at least in part on the live market data received at block 302.

The process 300 may determine auction locations for one or more vehicles at block 312. At block 314, the process 300 may receive proxy bid settings from dealers, in some examples, based at least in part on the justifiable price, for vehicles with the desired grade attributes and within an acceptable geographic range. At block 316, the process 300 may place one or more proxy bids at wholesale auctions for dealers. The process 300 may then end at block 318 by listing for sale, or otherwise posting onto retail markets, vehicles acquired through the proxy bidding process.

Illustrative systems and methods of vehicle desirability and stocking determinations are described above. Some or all of these systems and methods may, but need not, be implemented at least partially by an architecture such as that shown in FIG. 1. It should be understood that certain acts in the methods need not be performed in the order described, may be rearranged or modified, and/or may be omitted entirely, depending on the circumstances. Also, any of the acts described above with respect to any method may be implemented by a processor or other computing device based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system, comprising:
at least one memory that stores computer-executable instructions; and
at least one processor configured to access the at least one memory, wherein the at least one processor is configured to execute the computer-executable instructions to:
receive one or more vehicle purchasing parameters from a dealer;
receive a plurality of behavior metrics associated with a plurality of consumers, wherein the plurality of consumers collectively includes consumers of the dealer, consumers of a vehicle wholesaler online auction, and consumers of a vehicle retailer, and wherein the plurality of behavior metrics collectively includes record searches, hyperlink selections, offers, prices, and purchases made;
determine, based at least in part on the one or more vehicle purchasing parameters and all of the plurality of behavior metrics, a desirability score of one or more vehicles for sale by the vehicle wholesaler online auction, wherein the desirability score comprises respective scores associated with an interest, a sales volume, a market day supply, a retail profitability, and an availability of the one or more vehicles;
determine, based at least in part on the one or more vehicle purchasing parameters and all of the plurality of behavior metrics, a justifiable purchase price for the one or more vehicles for sale by the vehicle wholesaler online auction;
determine a location of the one or more vehicles for sale by the vehicle wholesaler online auction;
determine, based at least in part on all of the desirability score, the justifiable purchase price, and the location of the one or more vehicles for sale by the vehicle wholesaler online auction, at least a portion of the one or more vehicles for sale by the vehicle wholesaler online auction to place on a buy list for restocking an inventory of the dealer;
determine, based at least in part on a past sales history of the dealer and a preferred dealer day supply of vehicles, a number of vehicles on the buy list to bid on;
place a bid or bid range with the vehicle wholesaler online auction for purchasing one or more of the vehicles on the buy list; and place a listing with the vehicle retailer for selling one or more vehicles purchased from the buy list.

2. A method, comprising:

receiving, by one or more computers comprising one or more processors, one or more vehicle purchasing parameters from a dealer;

receiving, by the one or more computers, a plurality of behavior metrics associated with a plurality of consumers, wherein the plurality of consumers collectively includes consumers of the dealer, consumers of a vehicle wholesaler, and consumers of a vehicle retailer, wherein the plurality of behavior metrics collectively includes record searches, hyperlink selections, offers, prices, and purchases made;

determining, by the one or more computers and based at least in part on the one or more vehicle purchasing parameters and also based at least in part on all of the plurality of behavior metrics, a desirability score of one or more vehicles, wherein the desirability score comprises respective scores associated with an interest, a sales volume, a market day supply, a retail profitability, and an availability of the one or more vehicles;

determining, by the one or more computers and based at least in part on the one or more vehicle purchasing parameters and also based at least in part on all of the behavior metrics, a justifiable purchase price for the one or more vehicles;

determining, by the one or more computers, a location of the one or more vehicles; and determining, by the one or more computers and based at least in part on the entire desirability score, the justifiable purchase price, and the location of the one or more vehicles, at least a portion of the one or more vehicles for restocking an inventory of the dealer.

3. The method of claim 2, further comprising determining, by the one or more computers and based at least in part on a past sales history of the dealer and a preferred dealer day supply of vehicles, at least a portion of the one or more vehicles to place on a buy list.

4. The method of claim 3, further comprising receiving, by the one or more computers, an approval or veto from the dealer to place a bid on one or more of the vehicles on the buy list.

5. The method of claim 4, further comprising placing, by the one or more computers and based at least in part on the dealer approval, a bid or bid range for purchasing one or more of the vehicles on the buy list.

6. The method of claim 5, further comprising placing, by the one or more computers, a listing with the vehicle retailer for selling one or more vehicles purchased from the buy list.

7. The method of claim 2, wherein the desirability score further comprises a weighted average of at least one of the interest, the sales volume, the market day supply, the retail profitability, or the availability of the one or more vehicles.

8. The method of claim 7, wherein the weighted average is defined based at least in part on a selection associated with the dealer.

9. The method of claim 2, wherein determining the interest further comprises receiving, by the one or more computers, a number of online searches made for the one or more vehicles for sale in a first market relative to a number of online searches made for the one or more vehicles for sale in a second market.

10. The method of claim 2, wherein determining the sales volume further comprises receiving, by the one or more computers, a number of sales of the one or more vehicles made based at least in part on at least one of a particular market or a predefined time period.

11. The method of claim 2, wherein determining the market day supply further comprises receiving, by the one or more computers, a ratio of market quantity of the one or more vehicles to an average daily retail sales rate for the one or more vehicles for a predetermined period of time.

12. The method of claim 11, further comprising receiving, by the one or more computer, the at least one of the market quantity or the average daily retail sales rate for the one or more vehicles from at least one of the vehicle wholesaler or the vehicle retailer.

13. The method of claim 2, wherein determining the retail profitability further comprises receiving, by the one or more computers, a purchase price and a sales price for the one or more vehicles.

14. The method of claim 2, wherein determining the availability further comprises receiving, by the one or more computers, a number of the particular vehicle for sale within at least one of a predefined distance or price.

15. One or more non-transitory computer readable media storing computer-executable instructions that, when executed by at least one processor, cause the at least one processor to perform a method comprising:

receiving one or more vehicle purchasing parameters from a dealer;

receiving a plurality of behavior metrics associated with a plurality of consumers, wherein the plurality of consumers collectively includes consumers of the dealer, consumers of a vehicle wholesaler, and consumers of a vehicle retailer, wherein the plurality of behavior metrics collectively includes record searches, hyperlink selections, offers, prices, and purchases made;

determining, based at least in part on the one or more vehicle purchasing parameters and also based at least in part on all of the behavior metrics, one or more vehicles;

determining, based at least in part on the one or more vehicle purchasing parameters and also based at least in part on all of the plurality of behavior metrics, a desirability score of the one or more vehicles, wherein the desirability score comprises respective scores associated with an interest, a sales volume, a market day supply, a retail profitability, and an availability of the one or more vehicles;

determining, based at least in part on the one or more vehicle purchasing parameters and also based at least in part on all of the behavior metrics, a justifiable purchase price for the one or more vehicles;

determining a location of the one or more vehicles; and determining, based at least in part on the justifiable purchase price and the location of the one or more vehicles, at least a portion of the one or more vehicles for restocking an inventory of the dealer.

16. The non-transitory computer readable media of claim 15, wherein the method further comprises determining, based at least in part on a past sales history of the dealer and a preferred dealer day supply of vehicles, at least a portion of the one or more vehicles to place on a buy list.

17. The non-transitory computer readable media of claim 16, wherein the method further comprises receiving an approval or veto from the dealer to place a bid on one or more of the vehicles on the buy list.

18. The non-transitory computer readable media of claim 17, wherein the method further comprises placing, based at least in part on the dealer approval, a bid or bid range for purchasing one or more of the vehicles on the buy list.

19. The non-transitory computer readable media of claim 18, wherein the method further comprises placing a listing with the vehicle retailer for selling one or more vehicles purchased from the buy list.

20. The non-transitory computer readable media of claim 15, wherein determining the desirability score further comprises determining an average of at least one of an interest, a sales volume, a market day supply, a retail profitability, or an availability of the one or more vehicles.

21. The non-transitory computer readable media of claim 15, wherein the desirability score further comprises a weighted average of at least one of the interest, the sales volume, the market day supply, the retail profitability, or the availability of the one or more vehicles.

22. The non-transitory computer readable media of claim 21, wherein the weighted average is defined based at least in part on a selection associated with the dealer.

23. The non-transitory computer readable media of claim 15, wherein determining the interest further comprises determining a number of online searches made for the one or more vehicles for sale in a first market relative to a number of online searches made for the one or more vehicles for sale in a second market.

24. The non-transitory computer readable media of claim 15, wherein determining the sales volume further comprises determining a number of sales of the one or more vehicles made based at least in part on at least one of a particular market or a predefined time period.

25. The non-transitory computer readable media of claim 15, wherein determining the market day supply further comprises determining a ratio of market quantity of the one or more vehicles to an average daily retail sales rate for the one or more vehicles for a predetermined period of time.

26. The non-transitory computer readable media of claim 25, wherein the method further comprises receiving the at least one of the market quantity or the average daily retail sales rate for the one or more vehicles from at least one of the vehicle wholesaler or the vehicle retailer.

27. The non-transitory computer readable media of claim 15, wherein determining the retail profitability further comprises determining a purchase price and a sales price for the one or more vehicles.

28. The non-transitory computer readable media of claim 15, wherein determining the availability further comprises determining a number of the particular vehicle for sale within at least one of a predefined distance or price.

* * * * *